US008369273B2

(12) United States Patent
Schliwa-Bertling et al.

(10) Patent No.: US 8,369,273 B2
(45) Date of Patent: Feb. 5, 2013

(54) METHOD AND APPARATUS FOR DISCRIMINATING BETWEEN CONTROL MESSAGES AND SPEECH PAYLOAD

(75) Inventors: Paul Schliwa-Bertling, Ljungsbro (SE); Ingemar Johansson, Luleå (SE); John Walter Diachina, Garner, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 359 days.

(21) Appl. No.: 12/518,582

(22) PCT Filed: Jan. 4, 2008

(86) PCT No.: PCT/SE2008/050011

§ 371 (c)(1), (2), (4) Date: Jun. 10, 2009

(87) PCT Pub. No.: WO2008/097167

PCT Pub. Date: Aug. 14, 2008

(65) Prior Publication Data

US 2010/0014477 A1 Jan. 21, 2010

Related U.S. Application Data

(60) Provisional application No. 60/889,123, filed on Feb. 9, 2007.

(51) Int. Cl.
*H04W 4/00* (2009.01)

(52) U.S. Cl. ........................ 370/329; 370/468; 370/470

(58) Field of Classification Search ........................ None
See application file for complete search history.

(56) References Cited

U.S. PATENT DOCUMENTS

| | | | | |
|---|---|---|---|---|
| 6,339,590 | B2 * | 1/2002 | Kim | 370/331 |
| 6,807,154 | B1 * | 10/2004 | Malmgren et al. | 370/468 |
| 6,832,195 | B2 * | 12/2004 | Johnson | 370/468 |
| 6,898,194 | B1 * | 5/2005 | Vedrine | 370/329 |
| 7,068,623 | B1 | 6/2006 | Barany et al. | |
| 7,506,156 | B2 * | 3/2009 | Christensen et al. | 709/226 |
| 2002/0024972 | A1 * | 2/2002 | Yi et al. | 370/470 |
| 2003/0100298 | A1 * | 5/2003 | Butler | 370/468 |
| 2004/0165560 | A1 * | 8/2004 | Harris et al. | 370/336 |
| 2009/0073927 | A1 * | 3/2009 | Ishii et al. | 370/329 |

FOREIGN PATENT DOCUMENTS

| | | | |
|---|---|---|---|
| EP | 1294206 | A2 | 3/2003 |
| EP | 1675349 | A1 | 6/2006 |
| WO | WO 2005006605 | A1 * | 1/2005 |

* cited by examiner

*Primary Examiner* — Jeffrey M Rutkowski
(74) *Attorney, Agent, or Firm* — Coats & Bennett, P.L.L.C.

(57) ABSTRACT

A base station detects the transition of a mobile station from a DTX mode to a continuous transmission mode. The base station schedules an uplink transmission by the mobile station during an uplink transmission period while the mobile station is in DTX mode and receives an uplink LLC PDU from said mobile station during the scheduled uplink transmission periods. The base station determines the operating mode of the mobile station based on the size of the received uplink LLC PDU.

18 Claims, 4 Drawing Sheets

METHOD AND APPARATUS FOR DISCRIMINATING BETWEEN CONTROL MESSAGES AND SPEECH PAYLOAD

TECHNICAL FIELD

The present invention relates generally to packet data communications over wireless networks, and more particularly, to a method and apparatus for detecting when a mobile station transitions between discontinuous and continuous transition modes.

BACKGROUND

The GSM Packet Radio Service (GPRS) standard was developed to provide packet data services to mobile stations. The GPRS standard enables multiple mobile stations to share the same time slot or time slots for uplink communications. When establishing a packet data session, the mobile station is assigned one or more time slots in the uplink and downlink. In the channel assignment, the mobile station is given a Temporal bit Flow Identity (TFI) and Uplink State Flag (USF).

For downlink communications, the data blocks transmitted on the downlink include a TFI in the header to identify the mobile station for which the data block is intended. The mobile stations monitor their assigned time slots on the downlink for downlink transmission and decode the data blocks that include their own TFI.

For uplink communications, a scheduler at the base station schedules the mobile stations sharing the same time slot or time slots. The scheduler indicates when the mobile station is scheduled to transmit in a given uplink time slot by including that mobile station's USF in a data block transmitted in a corresponding downlink time slot. A mobile station is allowed to transmit on the uplink when it detects its USF in the data block transmitted in the corresponding downlink time slot.

In order to reduce interference and save battery power, the mobile station may operate in a Discontinuous Transmission mode (DTX). In DTX mode, the mobile station may turn its transmitter off during periods when it does not have any data to send. For example, in voice over IP (VoIP) the user may be listening to a remote user. Because the user is not speaking, there is no data to send. Therefore, interference may be reduced and power saved by DTX mode. When the user begins speaking the mobile station may switch back to a continuous transmission mode (CTX).

Typically, when the mobile station is in discontinuous transmission mode, the scheduler at the base station is notified or may otherwise determine when the mobile station transitions into DTX mode to avoid wasting uplink bandwidth since the mobile station will not have any data to send to the base station. Similarly, when the mobile station transitions from DTX mode back to CTX mode, the scheduler needs to be notified or otherwise determine that a transition to CTX mode has occurred so that it may resume normal USF scheduling for that mobile station, which is required when the user is actively speaking. Some applications, such as VoIP, are highly sensitive to latency. Therefore, when a mobile station transitions from DTX mode to CTX mode, normal USF scheduling needs to resume as quickly as possible in order to avoid latency in the delivery of speech payload to the far end user. Excessive latency will cause speech payload to be discarded and therefore noticeable interruptions in speech (i.e. missing speech) and degradation of the perceived quality of the connection will result.

SUMMARY

The present invention provides a method for determining when a mobile station in DTX mode has transitioned to CTX mode so that normal USF scheduling may resume. The base station still schedules the mobile station for uplink transmissions at a reduced rate (i.e., less than the normal USF scheduling rate) during an uplink transmission period while the mobile station is in DTX mode to allow the mobile station to transfer speech coder control messages such as Silence Insertion Descriptor (SID) frames to the network. These control messages are important for maintaining proper end to end operation of the speech coders during DTX mode. The mobile station may use the scheduled uplink transmission to send either these speech coder control messages (which do not contain actual user speech payload) or user data (which consists of actual user speech payload). When RLC data blocks are received at the base station 20 in a given scheduled uplink transmission period, it will be beneficial if the base station can determine whether the RLC data blocks contain speech coder control messages or user data. If the RLC data blocks contain a speech coder control message, the base station may assume that the mobile station is still in DTX mode. On the other hand, if the RLC data blocks contain user data (e.g., speech), the base station may determine that the mobile station has left DTX mode and transitioned to CTX mode and therefore respond by immediately resuming normal USF scheduling for that mobile station. Thus, the receipt of RLC data blocks containing user data is used to implicitly signal the transition from DTX mode to CTX mode.

According to one embodiment of the invention, the base station discriminates between RLC data blocks containing speech coder control messages and those containing speech based on the size of the upper layer data packet (i.e., an LLC PDU) carried by the RLC data blocks. Note that one or more RLC data blocks may be required to transmit a single LLC PDU. The base station considers a mobile station to be in DTX mode if the base station receives an uplink LLC PDU from the mobile station and the size of the LLC PDU is less than a certain threshold, since in this case a speech coder control message will have been received. Similarly, the base station considers the mobile station to have left DTX mode and as having entered CTX mode if the size of the LLC PDU is greater than the predetermined threshold, since in this case user data, i.e. speech payload, will have been received.

DETAILED DESCRIPTION

The present invention will be described in the context of a third generation (3G) mobile communication network, such as a GSM/EDGE network. Those skilled in the art will appreciate, however, that the present invention is applicable to systems implementing other standards. Therefore, the description should not be construed as limiting the present invention to GSM/EDGE networks.

Figure 1:
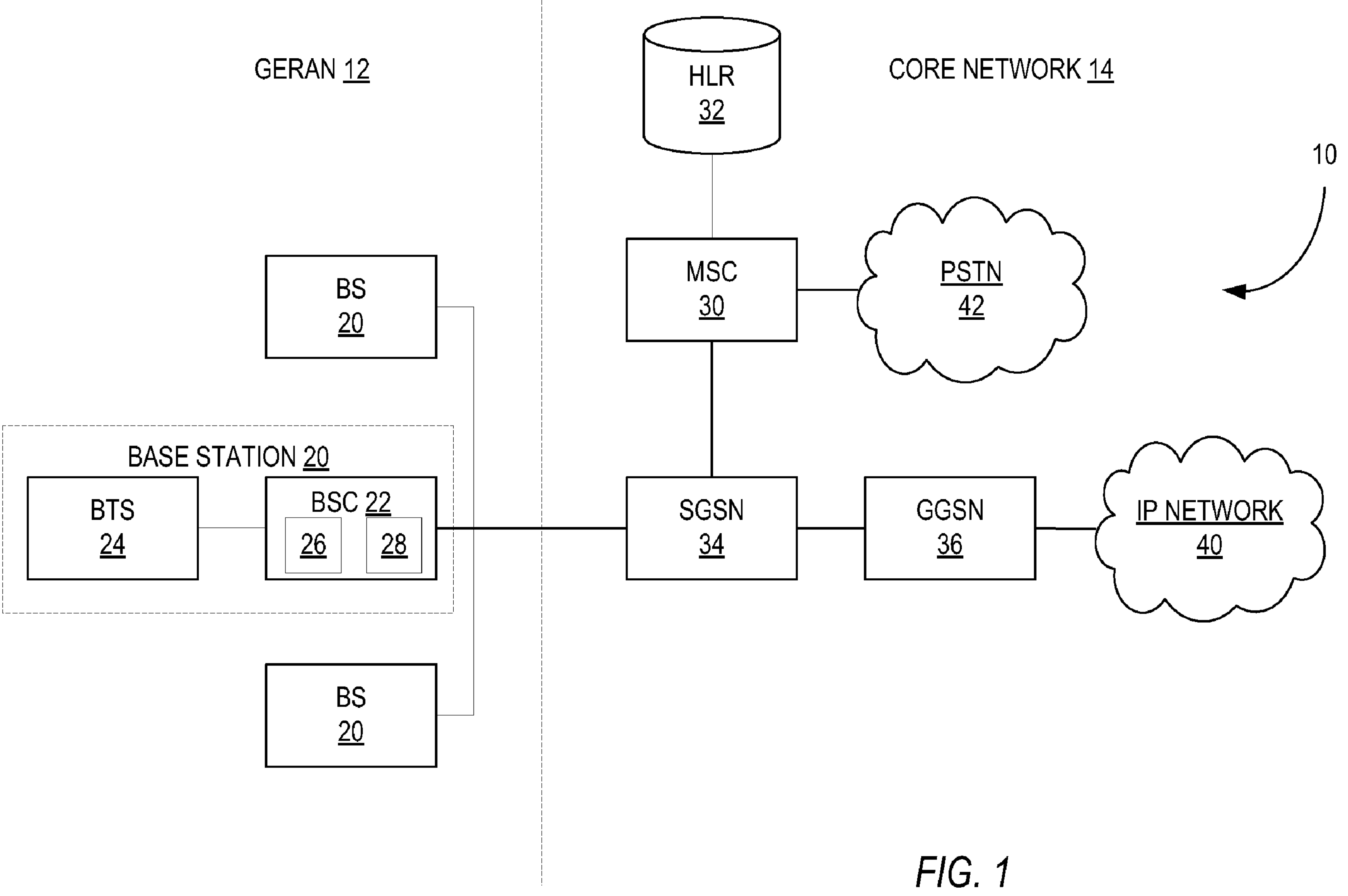
FIG. 1 shows a block diagram of the main functional elements of a GSM/EDGE network.

FIG. 1 illustrates an exemplary GSM/EDGE network indicated generally by numeral 10. The GSM/EDGE network 10 comprises a GSM/EDGE Radio Access Network (GERAN) 12 and a core network 14. The GERAN 12 typically comprises one or more Base Station Subsystems (BSSs) 20, hereinafter referred to simply as base stations 20. Each base station 20 comprises a Base Station Controller (BSC) 22 and one or more Base Transceiver Stations (BTSs) 24. BTS 24 comprises the antennas, RF equipment, and baseband processing circuits needed to communicate with mobile stations. The BSC 22 connects the BTS 20 to the core network 14 and controls the radio resources of the GERAN 12. BSC 22 may include a scheduler 26 for scheduling uplink transmissions by mobile stations over shared packet data channels. The BSC 22 may further include a detection unit 28 for detecting the transition of the mobile station from DTX mode to continuous transmission mode. The functions of the scheduler 26 and detection unit 28 may be implemented using one or more processors, microcontrollers, hardware, or a combination thereof.

Core network 14 comprises at least one Mobile Switching Center (MSC) 30, a Home Location Register (HLR) 32, at least one Serving GPRS Support Node (SGSN) 34, and one or more Gateway GPRS Support Nodes (GGSN) 36. The core network 14 connects provides both circuit-switched and packet data communication with various external networks. The MSC 30 handles circuit-switched communications and connects to the Public Switched Telephone Network (PSTN) 42 as known in the art. The HLR 32 stores subscriber information and the current location of the subscriber. The SGSN 34 handle packet data communications with mobile stations. The GGSN 36 provides connection to external packet-switched networks, 40, such as the Internet.

Figure 2:
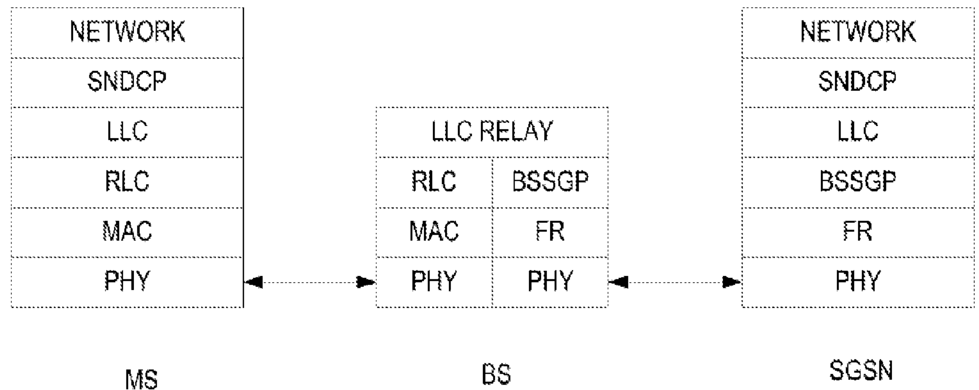
FIG. 2 shows an exemplary protocol architecture for packet data transmission in GPRS networks

FIG. 2 illustrates a packet data protocols used in GPRS networks to enable transfer of packet data between a mobile station and the SGSN 34. The GPRS protocol includes the Network layer, the SubNetwork Dependent Convergence Protocol (SNDCP) layer, the Logical Link Control (LLC) layer, the Radio link control (RLC) layer, the Medium access Control (MAC) layer, the BSS GPRS Protocol (BSSGP) layer, the Network Services (NS) layer, and the Physical Layer (PL). The SNDCP layer receives data packets, such as IP packets from the network layer. The SNDCP layer is responsible for compressing the IP packets and multiplexing IP packets from different sources. The LLC layer is responsible for the transfer of packet data between the mobile station and a SGSN 34. The LLC layer inserts PDUs received from the SNDCP layer into LLC protocol data units (PDUs), which are passed down to the RLC layer. The RLC layer is responsible for the transfer of data between the mobile station and base station 20. The RLC layer segments each LLC-PDU into one or more RLC data blocks at the transmitter, and reassembles the RLC data blocks into LLC-PDUs at the receiver. The RLC layer also implements a retransmission protocol to enable the receiver to request retransmission of missed RLC data blocks. In the present invention, detection unit 28 is also part of the RLC layer. The MAC layer handles multiplexing of mobile stations and enables multiple mobile stations to share the same packet data channel. The scheduler 26 is part of the MAC layer. The BSSGP layer conveys routing and Quality Of Service (QOS) related information between the base station 20 and SGSN 34. The BSSGP layer provides transport of LLC PDUs between SGSN 34 and base station 20. The NS layer provides transport for BSSGP Signaling Data Units (SDUs) between SGSN 34 and base station 20.

Figure 3:
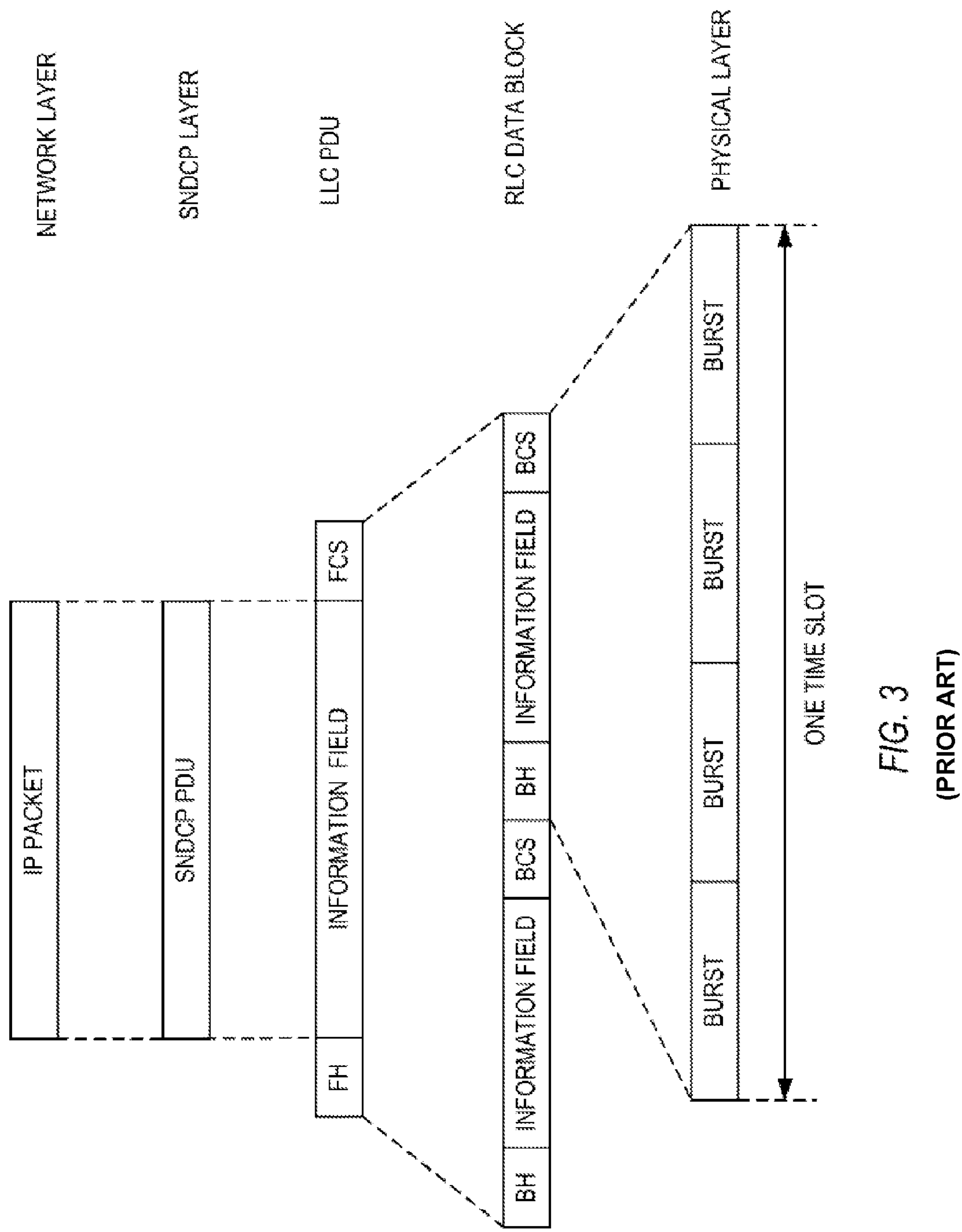
FIG. 3 shows transmission of packet data in a GPRS network.

FIG. 3 illustrates how data packets, such as IP packets, are transmitted over a GPRS network. IP packets received from the network layer are mapped into one or more SNDCP PDUs and each SNDCP PDU is mapped into a single LLC PDU. Each LLC PDU, also called LLC frames, includes a Frame Header (FH), an information field, and a Frame Check Sequence (FCS). Each LLC PDU is, in turn, mapped onto one or more RLC data blocks. The RLC data blocks include a block header (BH), information field, and Block Check Sequence (BCS), which may be used by the receiver to check for errors in the RLC data block. The RLC data blocks are then mapped onto physical layer radio blocks or burst. In a typical GPRS system, one RLC data block is mapped onto four physical layer bursts, which may be transmitted in a single timeslot.

Figure 4:
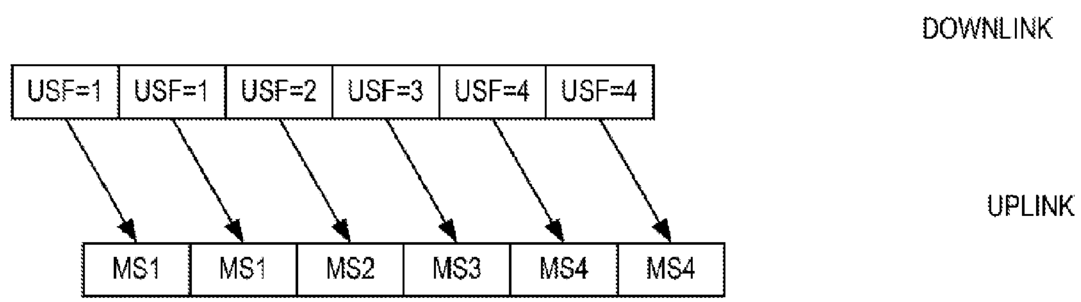
FIG. 4 shows USF-based scheduling in a GPRS network.

In the downlink direction the BH for the RLC data block includes an Uplink State Flag (USF) to support dynamic scheduling of mobile stations on the uplink. Each mobile station sharing an uplink packet data channel is assigned a unique USF. The USF typically contains three bits, allowing the uplink packet data channel to be shared by up to eight different users. A USF is included in the header of each RLC data block transmitted on the downlink to indicate the mobile station that is scheduled for the next uplink timeslot. The mobile stations sharing the same uplink timeslot monitor the transmissions on the corresponding downlink timeslot. When a mobile station detects its own USF in the downlink transmission, the mobile station is free to transmit in the next uplink timeslot as shown in FIG. 4. FIG. 4 illustrates six consecutive timeslots. A first mobile station (MS1) is scheduled to transmit in the first two uplink timeslots, a second mobile station (MS2) is scheduled to transmit in the third uplink timeslot, a third mobile station (MS3) is scheduled to transmit in a fourth uplink timeslot, and a fourth mobile station (MS4) is scheduled to transmit in the fifth and sixth uplink timeslots. A scheduler at the BSC 22 determines which mobile stations are allowed to transmit in which timeslots.

In order to save battery power and reduce interference, a mobile station may operate in a Discontinuous Transmission (DTX) mode. In DTX mode, the mobile station turns its transmitter off during periods when it does not have any data (i.e., speech payload) to send. For example, in voice-over IP (VoIP), the mobile station based user may be listening to a remote user in the network. Because the mobile station based user is not speaking, there is no data to send. Therefore, interference may be reduced and power saved by turning off the transmitter at the mobile station. When the mobile station based user resumes speaking, the mobile station may switch back to a continuous transmission (CTX) mode.

When the mobile station is in DTX mode, the scheduler 26 at the base station 20 is notified so that the scheduler 26 will not schedule the mobile stations according to the normal USF scheduling as long as the mobile station remains in DTX mode. Scheduling a mobile station in DTX mode using the normal USF scheduling would waste uplink resources because the mobile station does not have user data to send. When the mobile station has user data to send, it will transition from DTX mode to CTX mode. Some applications, such as VoIP, are highly sensitive to latency. Therefore, when a mobile station transitions from DTX mode to CTX mode, normal USF scheduling needs to resume as quickly as possible in order to avoid excessive packet latency.

The present invention provides a method for detecting the transition of a mobile station from a DTX mode to CTX mode. For purposes of illustration, the following description assumes that the mobile station is supporting a VoIP application. While the mobile station is in a DTX mode, the scheduler 26 at the base station 20 may continue to schedule uplink transmissions for the mobile station at a reduced rate so that the mobile station may still periodically transfer speech coder control messages to the network. The scheduled uplink transmissions for the mobile station in DTX mode will be less frequent than the scheduled transmissions for the mobile station in continuous transmission mode so that the uplink resources are not wasted. The reduced USF scheduling rate may take into account knowledge of the periodicity of speech coder control messages sent in DTX mode. When a mobile station in DTX mode is scheduled for an uplink transmission, it may use the scheduled uplink transmission to transmit either speech coder control messages (e.g., SID frames) or user data (e.g., speech). In either case the control messages or user data are carried within a single LLC PDU which is in turn conveyed using one ore more RLC data blocks. When the RLC data blocks are received at the base station 20, the base station 20 determines whether the LLC PDU conveyed by the RLC data blocks contains a speech coder control message or user data. If the LLC PDU contains a speech coder control message, the base station 20 may assume that the mobile station is still in DTX mode. On the other hand, if the LLC PDU contains user data (e.g., speech), then the base station 20 may assume that the mobile station has transitioned to CTX mode and therefore, may resume normal USF scheduling. Thus, receipt of an RLC data block containing speech is used to implicitly signal the transition from DTX mode to CTX mode.

In GPRS systems, both speech coder control messages and user data are sent from the mobile station to the base station 20 using RLC data blocks. Therefore, the base station 20 needs a convenient way to discriminate between RLC data blocks containing speech coder control messages and those containing user data. If the base station 20 falsely assumes that an LLC PDU conveyed by a sequence of one or more uplink RLC data blocks contains user data and resumes normal USF scheduling for that mobile station, the uplink bandwidth may be wasted because the mobile station may not have any user data to send to the base station 20.

According to one embodiment of the invention, the base station 20 discriminates between RLC data blocks containing speech coder control messages and those containing user data based on the size of the LLC PDUs transported in the RLC data blocks. Control messages sent by a mobile station in DTX mode will be contained in a small LLC PDU, typically in the order of 30-40 octets. Under good radio conditions, the entire LLC PDU may be transmitted to the base station 20 using a single RLC data block. When the mobile station has user data to send, such as where speech activity is resumed, the size of the first LLC PDU containing speech will be in the order of about 150-200 octets. When the base station 20 considers the mobile station to be in DTX mode, it may use the size of an LLC PDU transmitted by the mobile station to determine whether it contains a speech coder control message or user data. The size of the incoming LLC PDU may be determined by the base station 20 using RLC data block header information in one or more of the RLC data blocks that carry the LLC PDU.

In one exemplary embodiment, the scheduler 26 at the base station 20 may be configured to schedule up to two back-to-back (i.e., consecutive) uplink radio block transmissions on a given timeslot, depending on radio conditions, whenever it decides to provide the mobile station in DTX mode with an uplink transmission opportunity. Scheduling two back-to-back uplink radio block transmissions would ensure that the mobile station would always have enough contiguous uplink bandwidth to send a complete LLC PDU containing a control message even if radio conditions are poor. The base station 20 may consider the mobile station to remain in DTX mode if, during a scheduled uplink transmission, no corresponding uplink LLC PDU is received, or a short LLC PDU is received. In this case, the base station 20 continues scheduling uplink transmissions on the assumption that the mobile station is in DTX mode. If one or more RLC data blocks are received containing a LLC PDU, the base station 20 inspects the header information in one or more of the RLC data blocks and determines whether the mobile station has transitioned from DTX mode to CTX mode based on the size of the LLC PDU. If, for some reason, the base station 20 falsely assumes that the mobile station has transitioned into continuous transmission mode, the mobile station would be allocated more uplink bandwidth than it needed. Even if this false assumption is made, if no user data is subsequently transmitted within a predetermined period of time, the base station 20 may then consider the mobile station to be in DTX mode to avoid any further wasting of uplink resources.

Figure 5:
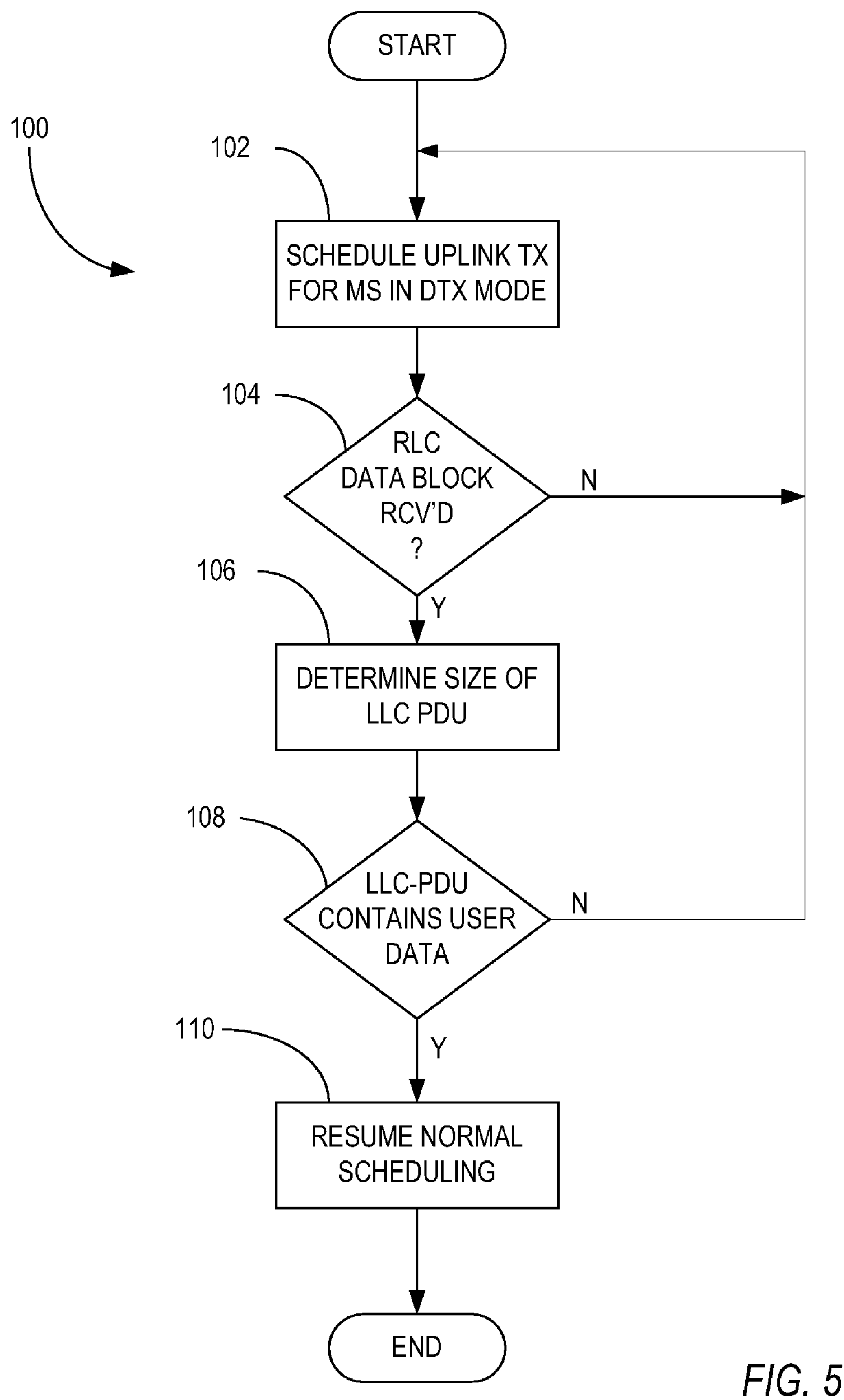
FIG. 5 shows an exemplary method for determining when a mobile station transitions from a DTX mode to a continuous transmission mode.

FIG. 5 illustrates an exemplary method 100 implemented by a base station 20 for determining when the mobile station has transitioned from DTX mode to CTX mode. The procedure begins when the mobile station is determined to be in DTX mode. The manner in which this determination is made is not material. The mobile station could signal the base station 20 when it transitions to DTX mode (e.g., using explicit air interface signaling). Alternatively, the base station 20 could determine the mobile station to be in DTX mode based on the failure of the mobile station to transmit radio blocks containing user data in one or more consecutive scheduled transmission opportunities. When the mobile station is in DTX mode, the scheduler 26 at the base station 20 may periodically schedule the mobile station for uplink transmissions with a lower than normal USF scheduling frequency to provide the mobile station with opportunities to transmit speech coder control messages (block 102). After an uplink transmission from the mobile station is scheduled, the base station 20 waits to receive an RLC data block in the scheduled uplink timeslot (block 104). If no RLC data block is received, the base station continues DTX uplink USF scheduling at a lower than normal rate (block 102). If an RLC data block is received, the detection unit 28 at the base station 20 determines the size of the LLC PDU using the Length Indicator field within the RLC data block header (block 106). Note that for the case where an LLC PDU spans multiple RLC data blocks, the base station 20 may have to receive more than a single RLC data block to determine the precise size of the LLC PDU. The detection unit 28 at the base station 20 then determines whether the LLC PDU contains speech (block 108) based on the size of the LLC PDU. This determination may be made by comparing the size of the LLC PDU determined in block 106 with a predetermined threshold. If the size of the LLC PDU is below the threshold, it may be assumed that the LLC PDU contains a speech coder control message. In this case, the mobile station continues DTX uplink USF scheduling at a lower than normal rate (block 102). If the size of the LLC PDU is greater than or equal to the threshold, the base station 20 may determine that the LLC PDU contains speech. In this case, the base station 20 may assume that the mobile station has transitioned from DTX mode to CTX mode and the scheduler 26 may resume normal USF scheduling (block 110).

The present invention may, of course, be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A method for detecting a change in an operating mode of a mobile station from a discontinuous transmission (DTX) mode to a continuous transmission mode, said method comprising:

scheduling an uplink transmission by said mobile station during an uplink transmission period while said mobile station is in said DTX mode;

receiving at least a portion of an uplink data packet from said mobile station during the uplink transmission period; and determining an operating mode of said mobile station based on a length of said uplink data packet.

2. The method of claim 1 wherein determining the operating mode of said mobile station based on the length of said uplink data packet comprises determining based on said length of said data packet whether the mobile station has transitioned from the DTX mode to the continuous transmission mode.

3. The method of claim 2 wherein said mobile station is determined to be in the DTX mode when the length of said data packet is less than a predetermined amount.

4. The method of claim 3 further comprising continuing scheduling uplink transmissions for the DTX mode if it is determined that said mobile station is in the DTX mode.

5. The method of claim 2 wherein said mobile station is determined to be in the continuous transmission mode when the length of said data packet is greater than a predetermined amount.

6. The method of claim 5 further comprising scheduling uplink transmissions for the continuous transmission mode if it is determined that said mobile station is in said continuous transmission mode.

7. The method of claim 6 further comprising detecting a change in the operating mode of said mobile station from said continuous transmission mode to the DTX mode based on the absence of a data packet during a subsequent scheduled uplink transmission period.

8. The method of claim 1 wherein said uplink data packet comprises a Logical Link Control (LLC) frame and wherein determining an operating mode of said mobile station based on a length of said uplink data packet comprises determining a length of said LLC frame.

9. The method of claim 8 wherein receiving at least a portion of an uplink data packet from said mobile station during the uplink transmission period comprises receiving one or more RLC data blocks containing said LLC frame, and wherein determining a length of said LLC frame comprises determining the length based on header information in one or more of said RLC data blocks.

10. A base station comprising:

a base transceiver station configured to transmit packet data to and receive packet data from a mobile station;

a scheduler circuit configured to schedule an uplink transmission by said mobile station during an uplink transmission period while said mobile station is in a discontinuous transmission (DTX) mode; and a detection unit circuit configured to determine an operating mode of said mobile station based on a length of an uplink data packet received during the uplink transmission period.

11. The base station of claim 10 wherein the detection unit circuit detects transition of said mobile station from said DTX mode to a continuous transmission mode based on the length of said data packet.

12. The base station of claim 11 wherein the detection unit circuit determines the mobile station to be in the DTX mode when the length of said data packet is less than a predetermined amount.

13. The base station of claim 12 further wherein the scheduler circuit continues scheduling uplink transmissions for the DTX mode if it is determined that said mobile station is in the DTX mode.

14. The base station of claim 11 wherein the detection unit circuit determines the mobile station to be in a continuous transmission mode when the length of said data packet is greater than a predetermined amount.

15. The base station of claim 14 wherein the scheduler circuit resumes a normal uplink scheduling for the continuous transmission mode if it is determined that said mobile station is in said continuous transmission mode.

16. The base station of claim 15 wherein the detection unit circuit further detects a change in the operating mode of said mobile station from said continuous transmission mode to the DTX mode based on the absence of a data packet during a subsequent scheduled uplink transmission period.

17. The base station of claim 10 wherein said uplink data packet comprises a Logical Link Control (LLC) frame and wherein the detection unit circuit determines an operating mode of said mobile station based on a length of said LLC frame.

18. The base station of claim 10 wherein said base station receives one or more RLC data blocks containing said LLC frame, and wherein the detection unit circuit determines the length of the LLC frame based on header information in one or more RLC data blocks.

* * * * *

UNITED STATES PATENT AND TRADEMARK OFFICE

CERTIFICATE OF CORRECTION

PATENT NO. : 8,369,273 B2
APPLICATION NO. : 12/518582
DATED : February 5, 2013
INVENTOR(S) : Schliwa-Bertling et al.

It is certified that error appears in the above-identified patent and that said Letters Patent is hereby corrected as shown below:

In the Specifications:

In Column 1, Line 47, delete "speaking" and insert -- speaking, --, therefor.

In Column 1, Line 65, delete "(i.e." and insert -- (i.e., --, therefor.

In Column 2, Line 46, delete "i.e." and insert -- i.e., --, therefor.

In Column 2, Line 53, delete "networks" and insert -- networks. --, therefor.

In Column 3, Line 13, delete "20" and insert -- 24 --, therefor.

In Column 3, Line 63, delete "Of Service (QOS)" and insert -- of Service (QoS) --, therefor.

In Column 5, Line 16, delete "ore" and insert -- or --, therefor.

In Column 5, Line 25, delete "mode" and insert -- mode, --, therefor.

Signed and Sealed this
Twenty-eighth Day of May, 2013

Teresa Stanek Rea
*Acting Director of the United States Patent and Trademark Office*